United States Patent [19]

Giattino

[11] 4,262,065

[45] * Apr. 14, 1981

[54] ADDITIVE FOR LITHIUM BATTERIES

[75] Inventor: Louis R. Giattino, Monterey County, Calif.

[73] Assignee: Altus Corporation, Palo Alto, Calif.

[*] Notice: The portion of the term of this patent subsequent to Sep. 11, 1996, has been disclaimed.

[21] Appl. No.: 61,762

[22] Filed: Jul. 30, 1979

Related U.S. Application Data

[63] Continuation-in-part of Ser. No. 930,374, Aug. 2, 1978, Pat. No. 4,167,608.

[51] Int. Cl.³ ............................................ H01M 10/36
[52] U.S. Cl. ................................... 429/101; 429/196

[58] Field of Search ................................. 429/101, 196

[56] References Cited

U.S. PATENT DOCUMENTS

| | | | |
|---|---|---|---|
| 3,926,669 | 12/1975 | Auburn | 429/196 |
| 3,998,657 | 12/1976 | Auborn et al. | 429/196 |
| 4,167,608 | 7/1979 | Giattino | 429/101 |

*Primary Examiner*—Donald L. Walton
*Attorney, Agent, or Firm*—Flehr, Hohbach, Test

[57] ABSTRACT

Electrochemical power cells having a lithium anode, a carbonatious current collector, and thionyl chloride active cathode depolarizer and electrolyte solvent are enhanced by adding copper thereto.

10 Claims, No Drawings

ADDITIVE FOR LITHIUM BATTERIES

CROSS REFERENCE TO RELATED APPLICATIONS

This is a continuation-in-part of application Ser. No. 930,374 filed on Aug. 2, 1978, now issued as U.S. Pat. No. 4,167,608, issued on Sept. 11, 1979.

BACKGROUND OF THE INVENTION

This invention relates to high energy electrochemical power cells. More particularly, it relates to cells having an oxidizable anode material and a liquid active cathode material and a solid current collector.

Recently there has been a rapid growth in portable electronic products requiring electrochemical cells to supply the energy. Examples are calculators, cameras and digital watches. These products, however, have highlighted the deficiencies of the existing power cells for demanding applications. For example, digital watches were developed using the silver oxide cell, and although these watches have become popular, it is now generally recognized that the least developed component of the digital watch system is the power cell. In particular, the energy density of the silver cells is such that thin, stylish watches with reasonable operating life are difficult to make. Additionally, these cells have poor storage characteristics, low cell voltages, and leakage problems.

In an effort to develop a cell that addresses one or more of the foregoing problems, substantial work has been done with cell chemistries using a lithium anode. The cathode and electrolyte material consisting of a solvent and solute vary. Indeed the literature is replete with examples of lithium anode cells with different cathodes and electrolytes. The electrical characteristics of these cells such as energy per unit volume, called energy density; cell voltage; and internal impedance vary greatly.

Among all of the known combinations of lithium anodes with different cathodes and electrolytes, those believed to have among the highest energy density and lowest internal impedance use certain inorganic liquids as the active cathode depolarizer. This type of cell chemistry is commonly referred to as "liquid cathode".

Early liquid cathode cells used liquid sulfur dioxide as the active cathode depolarizer as described in U.S. Pat. No. 3,567,515 issued to Maricle, et. al. on Mar. 2, 1971. Since sulfur dioxide is not a liquid at room temperature and at atmospheric pressure, it proved to be quite a difficult chemistry with which to work. More importantly, sulfur dioxide cells are unsafe for most consumer applications due to their propensity to explode under certain circumstances.

A major step forward in the development of liquid cathode cells was the discovery of a class of inorganic materials, generally called oxyhalides, that are liquids at room temperature and also perform the function of being the active cathode depolarizer. Additionally, these materials may also be used as the electrolyte solvent. Liquid cathode cells using oxyhalides are described in U.S. Pat. No. 3,926,669 issued to Auborn on Dec. 16, 1975, and in British Pat. No. 1,409,307 issued to Blomgren et al. on Oct. 18, 1975. At least one of the oxyhalides, thionyl chloride $(SOCl_2)$, in addition to having the general characteristics described above, also provides substantial additional energy density.

As described in the Auborn and Blomgren patents, the anode is lithium metal or alloys of lithium and the electrolyte solution is an ionically conductive solute dissolved in a solvent that is also an active cathode depolarizer.

The solute may be a simple or double salt which will produce an ionically conductive solution when dissolved in the solvent. Preferred solutes are complexes of inorganic or organic Lewis acids and inorganic ionizable salts. The requirements for utility are that the salt, whether simple or complex, be compatible with the solvent being employed and that it yield a solution which is ionically conductive. According to the Lewis or electronic concept of acids and bases, many substances which contain no active hydrogen can act as acids or acceptors or electron doublets. In U.S. Pat. No. 3,542,602 it is suggested that the complex or double salt formed between a Lewis acid and an ionizable salt yields an entity which is more stable that either of the components alone.

Typical Lewis acids suitable for use in the present invention include aluminum chloride, antimony pentchloride, zirconium tetrachloride, phosphorus pentchloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

The double salts formed by a Lewis acid and an inorganic ionizable salt may be used as such or the individual components may be added to the solvent separately to form the salt. One such double salt, for example, is that formed by the combination of aluminum chloride and lithium chloride to yield lithium aluminum tetrachloride.

In addition to an anode, active cathode depolarizer and ionically conductive electrolyte, these cells require a current collector.

According to Blomgren, any compatible solid, which is substantially electrically conductive and inert in the cell, will be useful as a cathode collector since the function of the collector is to permit external electrical contact to be made with the active cathode material. It is desirable to have as much surface contact as possible between the liquid cathode and the current collector. Therefore, a porous material is preferred since it will provide a high surface area interface with the liquid cathode material. The current collector may be metallic and may be present in any physical form such as metallic film, screen or a pressed powder. Examples of some suitable metal current collectors are provided in Table II of the Auborn Patent. The current collector may also be made partly or completely of carbon. Examples provided in the Blomgren Patent use graphite.

Electrical separation of current collector and anode is required to insure that cathode or anode reactions do not occur unless electrical current flows through an external circuit. Since the current collector is insoluble in the electrolyte and the anode does not react spontaneously with the electrolyte, a mechanical separator may be used. Materials useful for this function are described in the Auborn Patent.

Although the varied cells described in the Blomgren and Auborn patents may be feasible, much of the recent interest is in cells using thionyl chloride as the active cathode depolarizer and electrolyte solvent. This results from thionyl chloride's apparent ability to provide greater energy density and current delivery capability than other oxyhalide systems. Yet even though thionyl chloride cells have proven to be the best performer among the oxyhalides, they have not lived up to expectations on energy density or internal impedance. Furthermore, the thionyl chloride cell is equally if not more dangerous than the sulfur dioxide cell. As a result, all known efforts to commercialize cells using this chemistry have failed.

SUMMARY OF THE INVENTION

The present invention is based on the discovery that a substantially safer lithium or calcium anode, thionyl chloride active cathode depolarizer cell with the added benefits of higher energy density and lower internal impedance can be made by adding copper to the cell.

Thus, it is an object of this invention to provide an improvement to the known lithium thionyl chloride cell that renders the cell safer.

It is another object to provide a lithium/thionyl chloride cell having higher energy densities than those reported in the literature.

Finally, it is the object of this invention to provide a lithium/thionyl chloride cell with low internal impedance.

These and other objects of the invention may be achieved by an electrochemical cell comprising an alkalimetal anode, a current collector spaced from said anode and comprising a porous body of carbon in which particulate copper has been dispersed and an electrolyte solution in chemical and electrical contact with both the current collector and anode, said electrolyte solution comprising an ionically conductive solute dissolved in an active cathode depolarizer selected from the group consisting of one or more of the following: phosphoryl chloride, sulfuryl chloride and thionyl chloride.

As mentioned previously, the basis of this invention is the discovery that the addition of elemental copper to the cell provides substantial improvements in both performance and safety. While the theoretical explanation of this phenomenon is not clear, and applicant does not intend to be limited to any theory of invention, at least one explanation of the results involves a reaction with the copper and elemental sulfur. Some of the several different reactions that could occur in the prior art cells (there is no conclusive evidence as to which reaction or reactions actually occur) are as follows:

$$3\ SOCl_2 + 8\ Li \rightarrow Li_2SO_3 + 6\ LiCl + 2S \qquad (1)$$

$$4\ SOCl_2 + 8\ Li \rightarrow Li_2S_2O_4 + 6\ LiCl + S_2Cl_2 \qquad (2)$$

$$4\ SOCl_2 + 8\ Li \rightarrow 4\ LiCl + SO_2 + S \qquad (3)$$

These reactions all release the same amount of electrical energy. However, equation (1) requires less thionyl chloride. Thus the energy density of this reaction is higher. That is, more electrical energy can be derived from a given volume of chemicals with the reaction of equation (1) than with the reaction of equations (2) or (3).

One possible explanation of the difference in energy of the cell of this invention is that the copper first acts as a catalyst to force the reaction to be a higher energy density reaction such as the reaction of equation (1), and second, combines with the elemental sulfur to form copper sulfide.

The significance of the copper sulfur reaction relates to safety. It is widely believed that the elemental sulfur in contact with lithium will explode above a certain temperature and that this temperature may be easily reached by short circuiting, reverse charging, or other electrical conditions, as well as exposure to high ambient temperatures. However, copper sulfide does not react explosively with lithium at any temperature likely to be experienced by batteries. Experimental evidence tends to support this in that batteries made pursuant to this invention do not explode under circumstances that would cause prior art batteries to explode.

DESCRIPTION OF A PREFERRED EMBODIMENT

Test results showing the effect of varying percentages of copper on energy density and internal impedance are provided in Table I. This data is given by way of examples to enable those persons skilled in the art to more clearly understand and practice the invention. They are intended to be illustrative and representative but not limiting to the scope of the invention.

Each of the entries in Table I represents a test cell having a nominal internal volume of 0.035 cu inches constructed in a typical button configuration with single disc shaped current collector, anode and separator. The electrolyte is a 1.5 molar solution of lithium aluminum tetrachloride in thionyl chloride. The anode is a 0.680 inch diameter disc of 0.020 inch thick lithium. The separator is a commercially available ceramic paper. The current collector is acetylene black. Particulate copper is dispersed in the acetylene black which is then compacted into a pellet. The only variable in the cell is the ratio by weight of carbon to copper.

TABLE I

| Ratio C:Cu | % Cu | Life mah | Load voltage | Current | Internal Impedance |
|---|---|---|---|---|---|
| 1:1 | 50 | 110 | 3.29 | 54.8 | 5.16 |
| 2:1 | 33 | 170 | 3.30 | 55.0 | 5.56 |
| 3:1 | 25 | 180 | 3.29 | 54.8 | 5.65 |
| 4:1 | 20 | 200 | 3.28 | 54.6 | 5.86 |
| 6:1 | 14 | 210 | 3.28 | 54.6 | 5.86 |
| 8:1 | 11 | 205 | 3.24 | 54.0 | 6.6 |
| 10:1 | 9.1 | 195 | 3.24 | 54.0 | 6.6 |
| 12:1 | 7.7 | 195 | 3.22 | 53.0 | 7.0 |
| 16:1 | 5.9 | 195 | 3.22 | 53.6 | 7.22 |
| — | 0 | 190 | 3.15 | 52.5 | 8.57 |

The foregoing results were taken from samples that were tested shortly after their construction. The trends generally indicated by the data in Table I are accentuated as the batteries are stored at elevated temperatures.

It is understood that the preferred embodiment described above does not limit the scope of the invention. Certainly copper in either a more or less finely divided state would be useful, and other battery geometrics such as spiral wound may also be employed with the present invention.

In addition to the foregoing, applicant believes there is a further advantage to the presence of copper in lithium anode, thionyl chloride cells. It is well known that when thionyl chloride is exposed to water, it hydrolyzes into acids, namely hydrochloric and sulfurous. These acids are known to react explosively with lithium. It is equally well known that lithium reacts with water to produce hydrogen gas and lithium hydroxide.

Although lithium batteries are typically constructed in a dry environment to preclude the hydrolyzation of the thionyl chloride and the lithium, precise control of the moisture under which the batteries are manufactured is not always possible. Occasionally the moisture in the manufacturing rooms raises above acceptable levels and certain amounts of hydrolyzation occur.

Under these circumstances, the inclusion of copper in the cell has the additional beneficial effect of performing a scavenger function for the by products of hydrolyzation. For example, copper reacts readily with hydrochloric and sulfurous acid to form salts which tend to be chemically less reactive than the acids. Thus, the potentially reactive hydrolyzation by-products are rendered less dangerous. For this function, the copper need not necessarily be in particulate form interspersed within the cathode (although this is still a preferred embodiment). Alternatively, the copper may be present as a copper plating upon the casing or as a copper sheet pressed or spot welded to the casing. Indeed the copper may be located anywhere in the cell so long as it does not short out the cathode and anode or otherwise mechanically interfere with the operation of the cell.

What is claimed is:

1. An electrochemical cell comprising:
   an anode selected from the group consisting of lithium and calcium;
   a carbonaceous current collector spaced from said anode;
   an ionically conductive electrolyte solution in intimate contact with said current collector and said anode, said electrolyte comprising an ionically conductive solute dissolved in an active cathode depolarizer selected from the group consisting of phosphoryl chloride, thionyl chloride or sulfuryl chloride; and
   an additive consisting primarily of copper in intimate contact with said electrolyte.

2. The electrochemical cell of claim 1 wherein said anode is primarily lithium.

3. The electrochemical cell of claim 2 wherein said cathode depolarizer is thionyl chloride.

4. The electrochemical cell of claim 3 wherein said solute is lithium aluminumtetrachloride.

5. The electrochemical cell of claim 1 wherein said copper is in sheet form.

6. The electrochemical cell of claim 5 wherein said copper is a coating on a surface of said cell.

7. The electrochemical cell of claim 1 wherein said anode material is primarily calcium.

8. An electrochemical cell comprising:
   a fluid-tight casing having first and second terminals electrically insulated from each other and electrically communicating between the exterior and interior of said casing;
   cathode means located within said cell and electrically connected to said second terminal;
   anode means located within said cell electrically connected to said first terminal, said anode means being positioned such that it is juxtaposed with said cathode means;
   electrolyte means located within said casing and in contact with said anode and cathode means and cooperating therewith to produce a voltage difference between said first and second terminals under normal operation;
   separator means located between said anode and cathode; and elemental copper in sheet form adjacent to and in mechanical contact with said casing.

9. The electrochemical cell of claim 8 wherein said elemental copper is plated upon an interior surface of said casing.

10. The electrochemical cell of claim 8 wherein said elemental copper comprises a thin sheet contiguous to the interior of said casing.

* * * * *